Sept. 26, 1933. G. E. COFFEY 1,928,368
VEHICLE CARRIED JACK
Filed Dec. 9, 1929
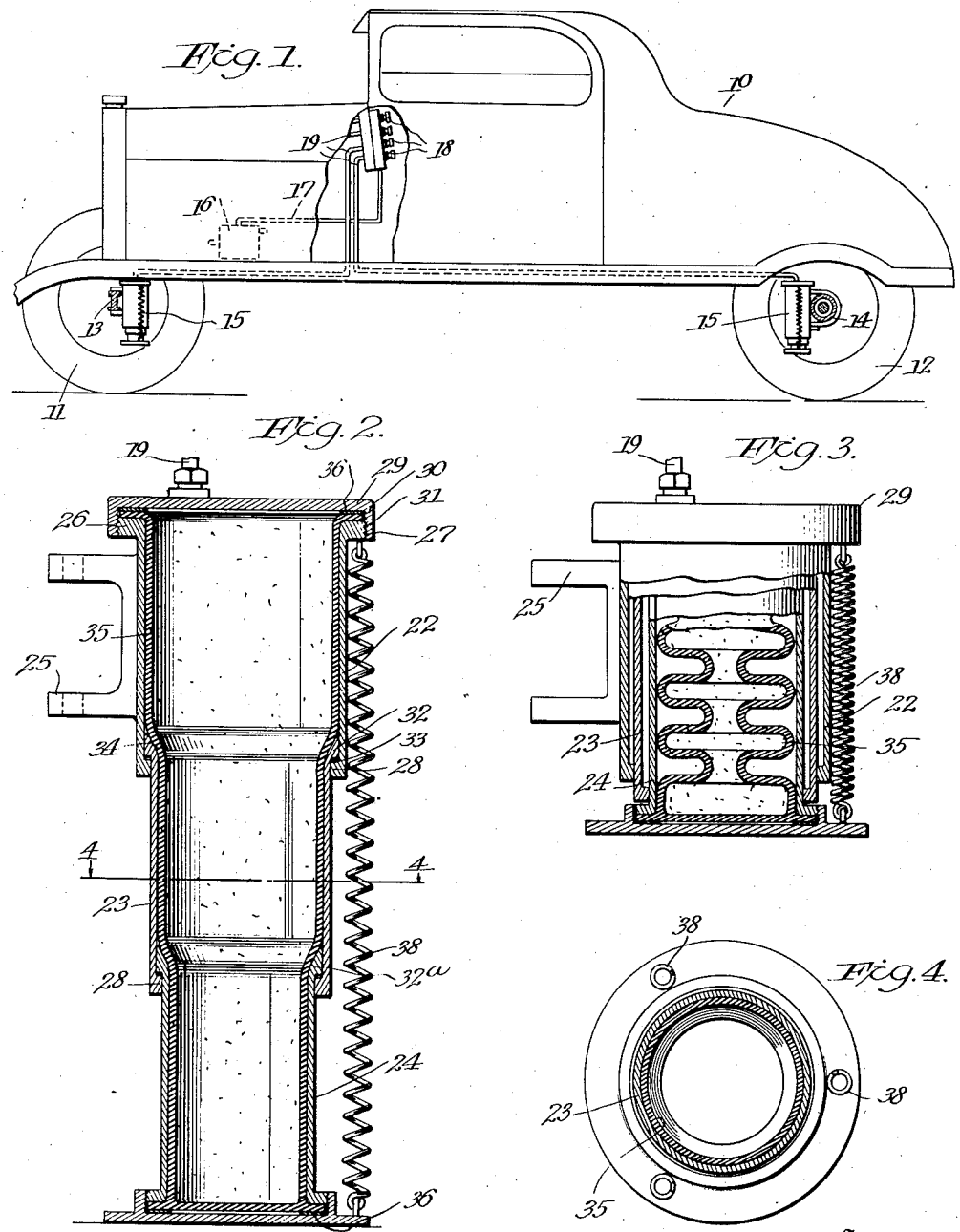
Inventor
George E. Coffey
By Cushman Bryant & Darby
Attorneys Patented Sept. 26, 1933

1,928,368

UNITED STATES PATENT OFFICE 1,928,368

VEHICLE CARRIED JACK

George E. Coffey, Blowing Rock, N. C.; Ralph S. Coffey, administrator of said George E. Coffey, deceased, assignor of one-half to John T. Miller, Blowing Rock, N. C.

Application December 9, 1929. Serial No. 412,884

2 Claims. (Cl. 254—93)

This invention relates to automobile jacks of the type which are operated by fluid pressure. More particularly it relates to fluid operated jacks which are permanently attached to and are carried by the vehicle.

One of the objects of the invention is to provide a plurality of jacks attached to the vehicle in such a position with respect to the wheels of the vehicle that the jacks may be rendered operative to raise any one or more of the wheels from the ground.

Another object of the invention is to provide novel means within the body of the vehicle for controlling the action of each of the jacks independently of the other jacks.

A further object of the invention is to provide a fluid operated jack constructed in such a manner that the accidental escape and consequent loss of the motivating fluid is rendered substantially impossible, said means including a fluid-tight sack or lining inside of a plurality of telescopic sections, which sections form the jack proper.

A further object is to provide means for normally holding the jack sections securely in retracted or inoperative position.

In the accompanying drawing, which shows an embodiment of my invention:—

Figure 1 is a side elevational view of the automobile with parts broken away, showing the relation of the various parts of my invention to each other and to the vehicle, Figure 2 is a vertical sectional view of one of the jacks embodying my invention, Figure 3 is a vertical elevation, partly in section, showing one of the jacks in collapsed or inoperative position, Figure 4 is a horizontal section taken on lines 4—4 of Figure 2, and Figure 5 is a detail sectional view of one of the two-way valves which control the operation of my improved jack.

In the drawing, wherein like reference characters represent like parts throughout the several views, an automobile 10, having wheels 11 and 12 and axles 13 and 14, is shown. Attached to each axle are two jacks, represented generally by the reference character 15. The system preferably includes the use of four jacks, each of which is secured to an axle adjacent one of the wheels of the vehicle.

I provide a source of fluid pressure 16 on the vehicle, which may take the form of a pump and storage tank, or a storage tank alone, or a pump alone, or any other appropriate means. I prefer to use air as a motivating fluid for the jacks, but it will be obvious to those skilled in the art that oil or other liquid fluids may be substituted therefor without departing from the spirit of my invention.

Leading from the said source of fluid under pressure is a conduit 17, which permits the flow of fluid to a plurality of valves 18. The construction of each of these valves is shown in Figure 5. From each valve there are two outlets, one of which connects with a conduit 19 leading to a jack, and the other of which constitutes an exhaust port 20. The rotatable valve body 21 has a T-shaped passage therein, which permits of communication between the inlet port and the conduit 19, in one position of the valve body, or from the conduit 19 to the exhaust port 20, in a second position thereof.

As shown in Figure 1, each conduit 19 leads to a different one of the four jacks 15 carried by the axles of the vehicle. It will be clear to one skilled in the art, therefore, that by manipulating any one of the valves 18, fluid pressure will be admitted to the corresponding jack, and by turning said valve to a second position, fluid under pressure in said jack will be allowed to escape and the jack collapsed by means hereinafter to be described.

Each of the four jacks carried by the vehicle is preferably constructed as shown in Figures 2 and 3. I provide a plurality of telescopic cylindrical sections, preferably three in number, represented in the drawing by reference characters 22, 23, and 24. For convenience, the largest section 22 carries a bracket 25, by means of which the jack is secured to the vehicle axle. Said bracket may be formed in any appropriate manner, and attached to the largest section and to the axle by means familiar to those skilled in the art, because the specific construction of this bracket forms no part of my invention.

At the upper end of section 22 I form a radially extending circumferential flange 26, provided with peripheral screw threads 27, and at the lower end of said cylinder I provide an inwardly extending annular shoulder 28. As a closure means for the larger cylinder, I use a cup-shaped cap 29 provided with a downwardly turned annular flange 30, having screw threads 31 on its inner periphery adapted to cooperate with threads 27, above described. The closure member 29 is made with an orifice adapted to receive a fluid inlet conduit 19 for the admission of motivating fluid to the interior of the telescopic sections.

The second or intermediate cylindrical section 23 of my jack has at its lower end an inturned annular shoulder formed in substantially the same manner as the corresponding part 28 on the larger cylindrical section. The upper end of this intermediate section is provided with a radially extending circumferential flange 32 of peculiar and novel construction. This flange has, on its underside, a plane radial surface 33 extending from the outer periphery of the section adapted to cooperate with the upper surface of the flange 28 on cylindrical section 22. Shoulder 28 and the flange 32 constitute interlocking means to limit the outward telescopic movement of the sections of the jack.

The inner surface of the flange 32, instead of being cylindrical, is, preferably, a section of a cone, or, in other words, is a bevel surface, as shown at 34. The smallest section 24 is also provided adjacent its upper end with a flange 32a having the same form as the above described flange 32. The purpose of the bevel 34 is to provide a substantially smooth interior periphery for the whole series of sections, so that there will be no sharp projecting joints between said sections.

An important feature of my invention relates to the use of a collapsible and extensible rubber sack or lining 35 inside of the telescopic sections. Preferably, this sack or lining takes the form of a rubber tube open at both ends, or open at one end and closed at the other. An open end, in either case, is secured to the upper end of the section 22 by clamping a marginal portion thereof between the cap member 29 and the flange 27. In order to make a fluid-tight seal along the joint between the sack and the other members, a washer 36 may be utilized. When the jack is in the extended position, as shown in Figure 2, the tubular sack or lining 35 closely fits the interior surface of the three sections and substantially fills the space therein.

The bottom end of the sack may be secured to the bottom of the lowermost section in clamped relation thereto, by substantially the same securing means as described in connection with the upper cylinder 22.

The bottom end of the smaller cylinder is provided with a closure 36, which, for convenience, may be constructed in substantially the same manner as the closure member 29, except that it has a radially extending flange 37.

Between the flanges 37 and 26 there are secured a plurality of tension springs 38 which have a tendency to retract the cylindrical sections to collapsed position, as shown in Figure 3. The specific number of these springs 38 is immaterial, but I find that three is a satisfactory number for mechanical effectiveness.

From the foregoing description, the operation of my device will be apparent to those skilled in the art. When it is desired to raise any particular wheel or combination of wheels, an appropriate valve 18 is turned to jack operating position. Fluid under pressure then flows from the source 16 through conduit 17, through valve body 21 to the appropriate conduit 19 leading to the jack to be operated. Fluid under pressure is thus admitted to the interior of the sack or lining 35, which is normally in the collapsed position shown in Figure 2. The force of thus fluid tends to expand the envelope, but the envelope being confined within the inner cylinder 24 cannot expand without extending the sections in telescopic movement to the position shown in Figure 2. Before the fully extended position shown in Figure 2 is reached, the foot 36 of the jack will contact with the road surface, and further extension of the sections to the fully extended position will raise the wheel from the road.

After the desired operation has been performed on the wheel, it may be lowered by turning the valve 18, so that conduit 19 is in communication with exhaust port 20. In this position of the valve, the source of fluid under pressure will be sealed and the fluid under pressure in the jack allowed to escape. Springs 38 assist in collapsing the jack and in exhausting the surplus air from the interior thereof.

It is obvious that certain changes may be made without departing from the spirit of my invention. For instance, the springs 38 might be dispensed with and the resilience of a rubber tube 35 relied upon to collapse the jack to the position shown in Figure 3. In such a case, the tube would not be shown in the pleated form indicated in this figure, but would necessarily be under some tension, even when the sections were in collapsed position. The form shown herein, however, is the preferred embodiment of my invention, and illustrates a construction having marked mechanical advantages.

I claim:—

1. A fluid operated jack adapted to be permanently secured to and carried by a vehicle axle, said jack comprising a plurality of telescoping sections, one of the sections having a radially extended circumferential flange provided with peripheral threads, a cap-like closure member for said last mentioned section having a downturned circumferential flange, said flange being provided with internal peripheral threads adapted to cooperate with the threads of said first-mentioned flange, a tubular sack of flexible material within said sections, an open-end of said sack being clamped between said first-mentioned flange and said cap-like member, and means to introduce fluid under pressure to the interior of said sack to extend the sections of said jack, and spring means associated with the largest and the smallest sections to collapse said jack.

2. A jack comprising a plurality of telescopic cylindrical sections, the outer and inner of said sections having outwardly projecting flanges at opposite ends thereof, a plurality of tension springs having opposite ends secured to said flanges to normally maintain said sections in retracted position, a distensible and collapsible fluid-tight lining in said sections, means to admit fluid under pressure to the interior of said lining, whereby said fluid under pressure will distend said tubular lining and extend the sections to lifting position, and means to permit the escape of fluid from the interior of said lining, whereby said tension springs become operative to collapse said lining and retract said sections.

GEORGE E. COFFEY.